US012251899B2

(12) United States Patent
Landertshamer

(10) Patent No.: US 12,251,899 B2
(45) Date of Patent: Mar. 18, 2025

(54) MESH NETWORK

(71) Applicant: Volm Companies, Inc., Antigo, WI (US)

(72) Inventor: Friedrich Landertshamer, Oftering (AT)

(73) Assignee: Volm Companies, Inc., Antigo, WI (US)

(*) Notice: Subject to any disclaimer, the term of this patent is extended or adjusted under 35 U.S.C. 154(b) by 76 days.

(21) Appl. No.: 17/641,720

(22) PCT Filed: Sep. 9, 2020

(86) PCT No.: PCT/US2020/049902
§ 371 (c)(1),
(2) Date: Mar. 9, 2022

(87) PCT Pub. No.: WO2021/050518
PCT Pub. Date: Mar. 18, 2021

(65) Prior Publication Data
US 2022/0339897 A1 Oct. 27, 2022

(30) Foreign Application Priority Data

Sep. 10, 2019 (AT) .............................. A 50787/2019

(51) Int. Cl.
*B29D 29/00* (2006.01)
*B29C 48/00* (2019.01)
*B29C 48/08* (2019.01)
*B29D 28/00* (2006.01)
*B29K 301/12* (2006.01)
*B29L 28/00* (2006.01)

(52) U.S. Cl.
CPC ........ *B29D 28/005* (2013.01); *B29C 48/0018* (2019.02); *B29C 48/08* (2019.02); *B29K 2301/12* (2013.01); *B29L 2028/00* (2013.01); *Y10T 428/24099* (2015.01); *Y10T 428/24116* (2015.01); *Y10T 428/24132* (2015.01)

(58) Field of Classification Search
None
See application file for complete search history.

(56) References Cited

U.S. PATENT DOCUMENTS

| 4,020,208 A | * | 4/1977 | Mercer | ................... B29C 48/10 264/DIG. 81 |
| 2011/0085749 A1 | * | 4/2011 | Frei | .......................... B32B 5/06 383/117 |
| 2014/0234606 A1 | | 8/2014 | Ausen et al. | |

FOREIGN PATENT DOCUMENTS

| EP | 1430972 A1 | 6/2004 |
| WO | 02/22381 A1 | 3/2002 |

* cited by examiner

*Primary Examiner* — Alexander S Thomas
(74) *Attorney, Agent, or Firm* — Boyle Fredrickson S.C.

(57) ABSTRACT

A meshwork has a layer forming a mesh, the mesh layer being disposed between parallel tension ribbons which are opposite one another in pairs. The tension ribbons have a thermoplastic bonding layer on the side facing the mesh layer and are connected to one another and to the mesh layer via the bonding layer. The mesh layer takes the form of a plastic net having meshwork webs which are connected to one another in a materially bonded manner and which are stretched and form diamond-shaped meshes, the longitudinal diagonals of which extend transversely to the tension ribbons.

10 Claims, 2 Drawing Sheets

MESH NETWORK

BACKGROUND

1. Field of the Invention

The invention relates to a meshwork having a mesh-forming layer between parallel tension ribbons facing each other in pairs, which have a thermoplastic bonding layer on the side facing the layer and are connected to each other and to the layer via the bonding layer.

2. Discussion of the Related Art

In order to obtain a meshwork which is easy to manufacture, has few thick points and has favorable conditions for good strength properties, it is known (WO 2010/081179 A2) that the meshwork is made of a laid fabric with meshwork webs crossing each other in groups and that the mutual position of these loose meshwork webs laid crosswise is secured by parallel tension ribbons which face each other in pairs and accommodate the meshwork webs crossing each other between them. Since the tension ribbons distributed over the meshwork surface are provided with a bonding layer made of a thermoplastic material on the inner surface facing the meshwork webs, a fusion connection or heat sealing is provided between the tension ribbons lying in pairs against each other and between these tension ribbons and the meshwork webs resting against their inner surface during hot pressing of the meshwork, so that the meshwork webs are tied to the tension ribbons via the thermoplastic bonding layer in a non-displaceable manner and are held in their mutual position by these tension ribbons. The mutual spacing of the tension ribbons in relation to the mesh size of the meshwork, in conjunction with the width of the tension ribbons, determine the dimensional stability of the meshwork, while its tensile strength in different directions and thus its load-bearing capacity depends in particular on the course and the strength properties of the mutually crossing meshwork webs. In order to meet the respective load requirements, the mesh size of the meshwork may be comparatively large, which has an advantageous effect on material use, but may limit the use of such meshworks when used in combination with small-sized goods, for example.

SUMMARY

The invention is thus based on the object of creating a meshwork that can be produced with a comparatively low material input in a simple production process and not only satisfies all strength requirements, but is also suitable as packaging material for small-sized goods.

Based on a meshwork of the type described above, the invention solves the problem by providing a plastic net as the layer forming the meshwork, the meshwork webs of which are connected to one another by means of a material connection and are stretched to form diamond-shaped meshes, the longitudinal diagonal of which runs transversely to the tension ribbons.

The close-meshed plastic net initially determines the size of the small parts that can no longer be retained by the meshwork, without increasing the material input, because the close-meshed plastic net can be formed comparatively thin due to the stretching. The stretching also increases the tensile strength of the plastic net, so that the interaction of the plastic net with the tension ribbons provides sufficient strength for the normal use of the meshwork as a packaging net, especially as the alignment of the longitudinal diagonal of the diamond-shaped meshes of the plastic net transverse to the tension ribbons ensures that the meshwork has a corresponding load-bearing capacity transverse to the tension ribbons. Due to the shear-resistant connection between the meshwork webs of the plastic net and the tension ribbons, the plastic net is kept in shape and the elasticity of the meshwork across the tension ribbons is limited, wherein the close-meshed plastic net is essentially only loaded by small parts, again only in limited local areas between the tension ribbons, which absorb the main load, because larger parts of the packaging find support on the tension ribbons and the tensile loads of the meshwork webs of the plastic net are partly transferred to the tension ribbons via the shear-resistant connections between the plastic net and the tension ribbons. The use of a close-meshed plastic net between the two tension ribbons disposed mutually opposite in pairs considerably simplifies the manufacturing effort compared to the well-known meshworks with the laid, intersecting groups of meshwork webs. The laid meshwork webs, which are each pulled off from a supply roll, are replaced by a plastic net with materially bonded meshwork webs. The usually fivefold to sixfold stretching of the plastic net does not require any special effort.

For the plastic net, a materially bonded connection is required between the meshwork webs. This requirement can be ensured in different ways. One possibility is to produce the plastic net from a plastic film stretched in the manner of an expanded mesh. Such a plastic net is not only easy to produce since it is only necessary to stretch a plastic film with parallel rows of staggered incisions transversely to the incisions, but the mesh size and mesh shape can also be easily adapted to the respective requirements. For this purpose, only the stretched plastic film with the incisions offset against each other has to be pulled apart crosswise to the incisions.

Another possibility is the use of a conventionally extruded plastic net, commercially available, which is stretched accordingly to ensure sufficient strength on the one hand and to adjust the thickness of the meshwork webs on the other hand.

Where the mesh size of the plastic net is selected such that the longitudinal diagonal of the diamond meshes of the plastic net is greater than the mutual distance between the tension ribbons, each mesh of the plastic net shall be retained at least once between a pair of tension ribbons with the effect that good dimensional stability and improved load-bearing capacity can be achieved for the mesh. Such a meshwork would therefore be an advantage in meeting the usual requirements, in particular with regard to the use of packaging.

BRIEF DESCRIPTION OF THE DRAWINGS

The subject matter of the invention is shown by way of example in the drawings, wherein.

DETAILED DESCRIPTION

Figure 1:
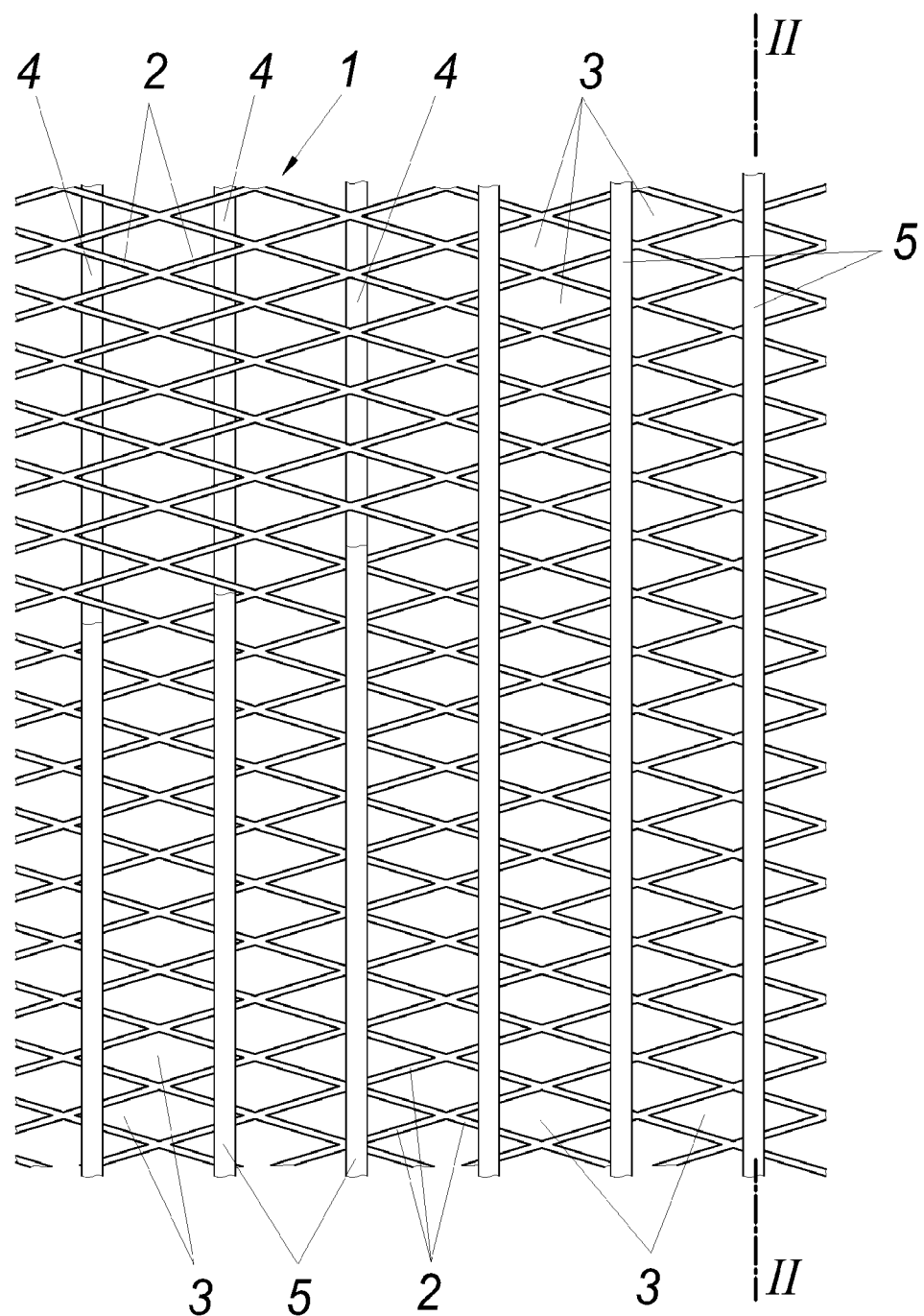
FIG. 1 shows a meshwork in accordance with the invention in sections in a partially elevated plan view.

The meshwork shown in FIG. 1 comprises a plastic net 1, the stretched meshwork webs 2 of which are connected to each other in a materially bonded manner and form diamond-shaped meshes 3. This comparatively close-meshed plastic net 1 is formed, for example, in the manner of an expanded mesh, from a plastic film which is provided in rows with incisions staggered in a gap in rows relative to one another and which is stretched in the longitudinal direction of the meshwork webs 2 resulting between the incisions, so that after the plastic film has been pulled apart transversely to the incisions a net with diamond-shaped meshes 3 is produced, the shape and size of which are determined by the extent to which the plastic film is pulled apart. Another way of producing a plastic net 1 with diamond meshes 3 is to stretch a standard extruded plastic net.

The stretched plastic net 1 is held in its mutual position in its respective shape and size of meshes 3 between two cover layers of parallel tension ribbons 4, 5, which extend at a distance from each other, adapted to the given requirements. For this purpose the tension ribbons 4, 5 are composed of at least two layers, namely a carrier layer absorbing tensile forces and a bonding layer of a thermoplastic material on the side of the carrier layer facing the plastic net 1.

As can be seen from FIG. 1, the arrangement is such that the longitudinal diagonals of the diamond-shaped meshes 2 of the plastic net 1 extend transversely to the tension ribbons 4, 5, wherein the length of the longitudinal diagonals is greater than the mutual spacing of the pairs of tension ribbons 4, 5. This ensures in a simple way that the meshwork webs 2 are held at least once per mesh 3 between the tension ribbons 4, 5 of a pair, which results in good dimensional stability and improved strength properties for the meshwork.

Figure 2:
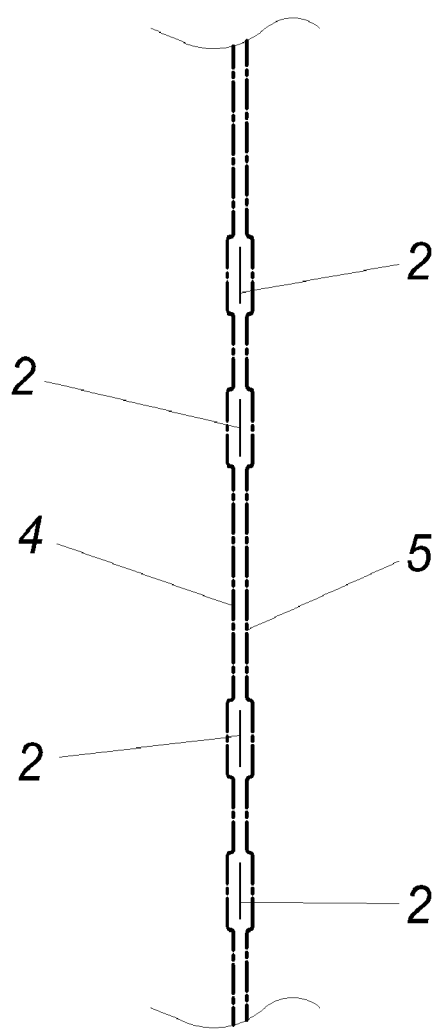
FIG. 2 shows the schematic arrangement of the individual layers of the meshwork in a section along the line II-II of FIG. 1 on a larger scale.

Since the tension ribbons 4, 5 of the two cover layers, which are opposite one another in pairs, overlap one another, the meshwork webs 2 of the plastic net 1 are held in a displaceable manner between the tension ribbons 4, 5, which are opposite one another, in accordance with FIG. 2, if, during hot pressing of the two cover layers with the plastic net 1 between them, a shear-resistant connection is made between the tension ribbons 4, 5, which lie adjacent one another, and the adjacent meshwork webs 2 of the plastic net 1 by means of a fusible connection or a heat seal.

After hot pressing, a meshwork is obtained which is largely dimensionally stable, shows only slight residual shrinkage and elongation and can be welded with similar nets, but also with foils and the like.

I claim:

1. A meshwork comprising:
a layer forming a mesh; and
first and second layers of tension ribbons provided on opposite sides of the mesh layer, the ribbons of each tension ribbon layer extending in parallel with one another,
   wherein the tension ribbons have a thermoplastic bonding layer on a side thereof facing the mesh layer and are connected to one another and to the mesh layer via the bonding layer, and wherein
   the mesh layer is formed from a plastic net having meshwork webs which are connected to one another in a materially bonded manner and which are stretched and form diamond-shaped meshes, longitudinal diagonals of which extend transversely to the tension ribbons, wherein the meshwork webs are formed from either a stretched, extruded plastic net or a plastic film stretched in the manner of an expanded mesh.

2. The meshwork according to claim 1, wherein the plastic net is formed from a stretched, extruded plastic net.

3. The meshwork according to claim 1, wherein the plastic net is made of a plastic film stretched in the manner of an expanded mesh.

4. The meshwork according to claim 1, wherein a length of the longitudinal diagonal of the diamond-shaped meshes of the plastic net is greater than a mutual spacing of the tension ribbons.

5. The meshwork according to claim 1, wherein tension ribbons of the first layer extend colinearly with tensions ribbons of the second layer.

6. The meshwork according to claim 1, wherein the tension ribbons have a carrier layer facing away from the mesh layer.

7. The meshwork according to claim 6, wherein the carrier layer of each tension ribbon forms an outer layer of the tension ribbon.

8. A meshwork comprising:
a mesh layer; and
first and second layers of tension ribbons provided on opposite sides of the mesh layer, the ribbons of each tension ribbon layer extending in parallel with one another and being evenly spaced from other ribbons of the respective layer,
   wherein each of the tension ribbons has a thermoplastic bonding layer on a side thereof facing the mesh layer and a carrier layer that faces away from the mesh layer,
   wherein the tension ribbons are connected to the mesh layer via the bonding layer,
   wherein the mesh layer is formed from a plastic net having meshwork webs which are connected to one another in a materially bonded manner and which are stretched and form diamond-shaped meshes, longitudinal diagonals of which extend transversely to the tension ribbons, the meshwork webs being formed from either a stretched, extruded plastic net or a plastic film stretched in the manner of an expanded mesh, and
   wherein a length of the longitudinal diagonal of the diamond-shaped meshes of the plastic net is greater than a mutual spacing of the tension ribbons such that each diamond is in contact with at least one tension ribbon.

9. The meshwork according to claim 8, wherein tension ribbons of the first layer extend colinearly with and overlap tensions ribbons of the second layer, and wherein tension ribbons of the first layer are bonded to tension ribbons of the second layer in addition to being bonded to the plastic net.

10. The meshwork according to claim 9, wherein the carrier layer of each tension ribbon forms an outer layer of the tension ribbon.

* * * * *